US012748937B2

(12) United States Patent
Khanna et al.

(10) Patent No.: US 12,748,937 B2
(45) Date of Patent: Sep. 29, 2026

(54) VALID WIRELESS COMMUNICATION BUILDING ACCESS

(71) Applicant: Amazon Technologies, Inc., Seattle, WA (US)

(72) Inventors: Anubhav Khanna, Seattle, WA (US); Kaushik Mani, Sunnyvale, CA (US); Gerald J. Nievera, Las Vegas, NV (US); Andrew Bradley Palmer, Austin, TX (US); Sai Praveen Gummadi, Santa Clara, CA (US); Robi Thomas, Round Rock, TX (US); Cameron Sautner, Las Vegas, NV (US); Rishabh Sanghvi, Fremont, CA (US); Pavel Samarkin, Los Altos, CA (US); Ram Nikhil Dodda, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/045,663

(22) Filed: Feb. 5, 2025

(65) Prior Publication Data

US 2025/0181876 A1 Jun. 5, 2025

Related U.S. Application Data

(63) Continuation of application No. 18/374,965, filed on Sep. 29, 2023, now Pat. No. 12,265,869.

(60) Provisional application No. 63/511,449, filed on Jun. 30, 2023.

(51) Int. Cl.
*G06K 19/073* (2006.01)
*H01Q 1/36* (2006.01)

(52) U.S. Cl.
CPC ......... *G06K 19/07372* (2013.01); *H01Q 1/36* (2013.01)

(58) Field of Classification Search
CPC .. G06K 19/07372; G06K 19/00; G06K 19/07; G06K 19/067; G06K 19/06046
USPC ................................ 235/492, 487, 380, 375
See application file for complete search history.

(56) References Cited

U.S. PATENT DOCUMENTS

| | | | | |
|---|---|---|---|---|
| 10,573,106 | B1 * | 2/2020 | Brady | G06V 40/1365 |
| 11,297,373 | B2 * | 4/2022 | Ashraf | H04N 21/42203 |
| 11,362,853 | B2 * | 6/2022 | Scalisi | G08B 7/06 |
| 11,605,254 | B1 * | 3/2023 | Musabeyoglu | G06K 7/10297 |
| 2017/0061717 | A1 * | 3/2017 | Ouyang | G07C 9/00571 |
| 2021/0142601 | A1 * | 5/2021 | Schoenfelder | G05B 15/02 |
| 2024/0013199 | A1 * | 1/2024 | Marshall | G06Q 20/3274 |

(Continued)

FOREIGN PATENT DOCUMENTS

| | | | | |
|---|---|---|---|---|
| KR | 200477007 Y1 * | 5/2015 | | H04W 4/02 |
| WO | WO-2024061805 A1 * | 3/2024 | | H04L 67/02 |

*Primary Examiner* — Edwyn Labaze
(74) *Attorney, Agent, or Firm* — Pierce Atwood LLP

(57) ABSTRACT

The present disclosure presents wall-mounted near field communication systems and related methods. One such system comprises a sign assembly having a near field communication (NFC) tag configured to determine if the NFC tag has been tampered with. A mobile phone may connect with the NFC tag. If the exchange is valid and the NFC tag has not been tampered with, the system may perform an action such as allowing building access, connecting the mobile device to a resident's device, etc. If the NFC tag has been tampered with, the system may prevent building access or the like.

20 Claims, 16 Drawing Sheets

(56) References Cited

U.S. PATENT DOCUMENTS

| | | | | |
|---|---|---|---|---|
| 2024/0096151 | A1 * | 3/2024 | Ahmad | G07C 9/00309 |
| 2025/0254177 | A1 * | 8/2025 | Schwartz | H04L 63/107 |

* cited by examiner

100

VALID WIRELESS COMMUNICATION BUILDING ACCESS

CROSS-REFERENCE TO RELATED APPLICATION

This application is a continuation of, and claims the benefit of priority to, U.S. application Ser. No. 18/374,965, filed Sep. 29, 2023, entitled "Wall-Mounted NFC Device that Self Disables Upon Removal," which claims priority to U.S. provisional application entitled, "Wall-Mounted NFC Device that Self Disables Upon Removal," having application No. 63/511,449, filed Jun. 30, 2023. The above applications are hereby incorporated by reference in their entireties.

BACKGROUND

Currently at electrically-access restricted buildings, residents use a callbox to allow their guests into the common spaces of a property-usually the lobby. These callboxes are often paired with a key-fob reader, a numerical access-code pin to enter, or a biometric sensor, which in turn allow building owners to monitor access and track usage. For example, callboxes maybe installed at the pedestrian access point of a building, and are configured to the resident's phone (landline or cellphone/smart-phone). When a guest requests access, the resident receives a phone call and presses *9/#9 on their phone to authorize access and open the door. In some older buildings, intercom (non-telephony) based systems require a guest to ring a doorbell associated with the building unit/resident, so that the resident can unlock the door via an intercom handset-however the resident must use a physical key (or key-fob) to enter the building. These systems are prone to a wide set of issues, and lack features that customers (residents, property managers, guests, et al.) seek. Such issues include security concerns, support/maintenance issues, high costs, and lack of convenience, among others.

Regarding security concerns, residents with voice-based callboxes can currently only rely on a guest's voice to authenticate a visitor. They cannot see who is requesting access at the door. Additionally, when residents get a phone call, caller IDs can be generic and one number can be common to all buildings outfitted with a callbox. Additionally, access codes are static and can be easily shared. Apart from providing rudimentary logs on when an access code was used, or when a door was opened—building owners cannot view a comprehensive audit trail about their property—i.e. tying back an access code to who specifically used it, who handed them out, when were they handed out, etc.

With respect to support/maintenance, callboxes generally have built-in liquid crystal display (LCD) screens that are susceptible to physical damage, can malfunction if not weather-rated, and can potentially have their databases/records erased. Building residents and/or maintenance staff also may not know who to reach out to for support. Larger (50+ unit) buildings typically face a 10% monthly churn rate in residents moving in/out. Thus, these systems must be updated constantly through a cumbersome process. For intercom-based systems, nametags need to be updated outside a building, and callboxes can be updated using the callbox keypad or through a file upload. Further, callboxes and intercom-based systems are expensive to install and maintain.

Lastly, residents with intercoms must be at home to provide access, and all residents (regardless of telephone-based callboxes or intercom units) must carry their keys/key-fobs to enter the building. Residents cannot provide temporary access to their guests/visitors unless they hand over their key-fobs which are susceptible to theft/loss. Any chances to callboxes (e.g. updating display names) must be resolve by working with building managers. Older callboxes are not integrated with various property technologies e.g. rent or tenant management software, thereby preventing seamless updates of callbox directories when tenants move in or out.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure provides systems, apparatuses, and methods for providing shared access to physical spaces via an improved access control solution using a wall-mounted near field communication (NFC) device that facilitates entry by building residents and guests.

Figure 1:
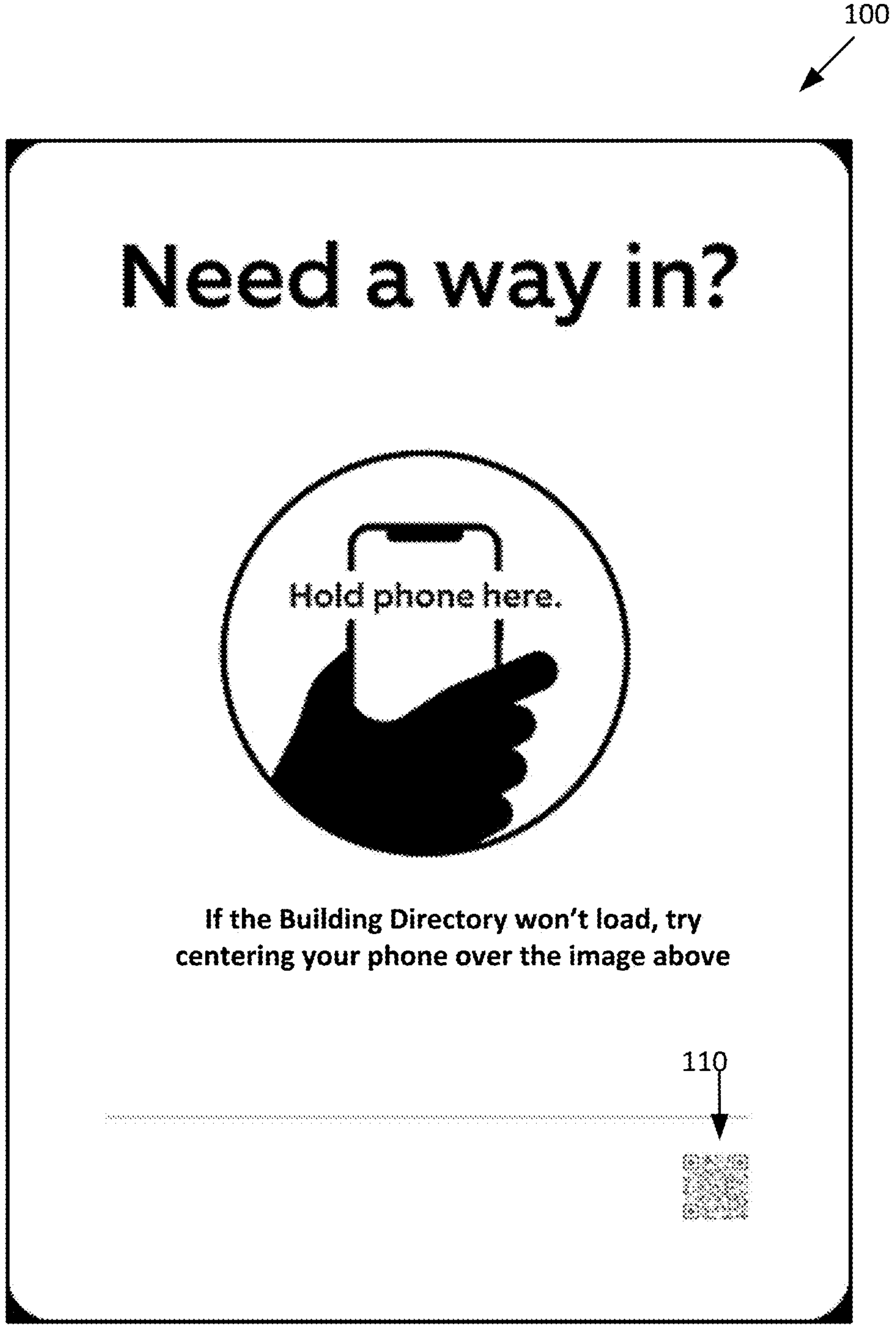
FIG. 1 shows a front view of an exemplary access device in accordance with various embodiments of the present disclosure.

In one such embodiment, a wall-mounted NFC device can be installed proximate a building entry to facilitate entry by residents and guests, e.g., as part of building directory sign 100 (also referred to as an "access" device), as shown in FIG. 1. The sign may have instructions on how to hold their NFC-enabled phone or where to hold their phone in proximity to one or more locations on the sign. Thus, in various embodiments, one or more NFC tags can be embedded within the sign to allow for one or more guests to make use of the sign at a time. Accordingly, current mobile phones generally have NFC readers that can communicate with an NFC tag embedded in the building directory sign 100. While the examples below describe an NFC reader and a passive NFC tag, the embodiments herein can be used with other radio frequency communication protocols, such as an RFID reader and an radio frequency identification (RFID) tag. A quick response (QR) code 110 may also be displayed on a front of the signage, such that the QR code 110 will a generic link pointing to a web page that tells a reader more about how to use their phone to tap on the building directory plate using NFC.

Figure 2:
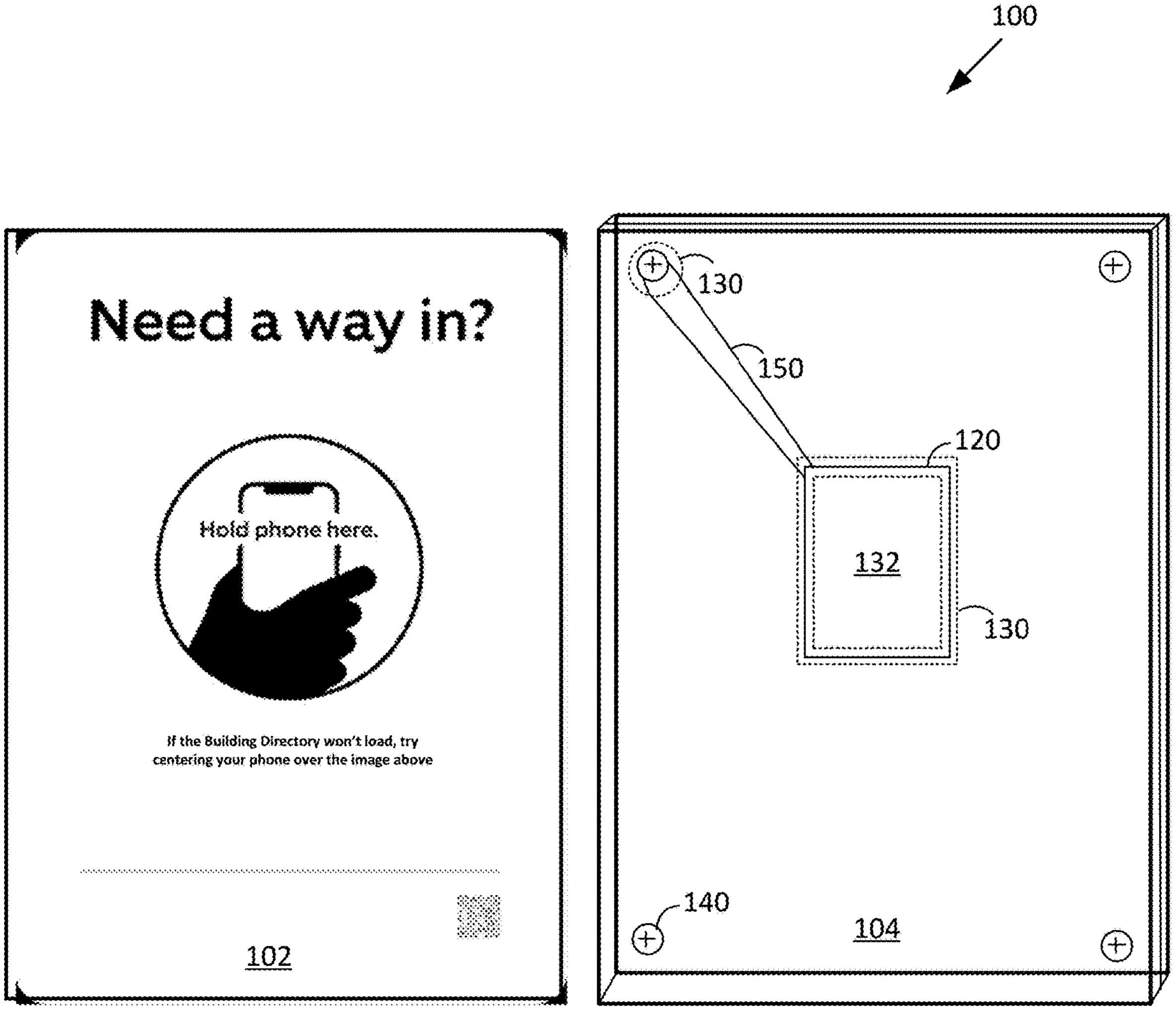
FIG. 2 shows a view of the exemplary access device of FIG. 1 with a front cover or panel removed from the access device to shown internal components.

Referring now to FIG. 2, an exemplary access device 100 of the present disclosure contains a front plate 102 and a back plate 104, where the front plate contains visual art and/or text that is viewable by a person that approaches the sign. In the figure, the front and back plates are not secured to one another in order to show the components that would not be visible when the plates are secured to one another.

In various embodiments, the back plate 104 is secured to one or more passive NFC tags 120 using a strong adhesive 130, such as glue. In various embodiments, for each NFC tag 120, the back plate has an inlay or a type of fitted depression in the back plate where the NFC tag 120 can be positioned. In accordance with various embodiments, the NFC tag features a substrate having one or more zones or areas of vulnerability (e.g., an area that is thinner than neighboring areas of the substrate, contains a cutout section, etc.) that is reinforced by the strong adhesive on the sign but is prone to being torn apart in response to a pulling or shear force applied to the sign (and therefore the NFC tag) after the sign is secured to a wall. Additionally, in various embodiments, the back plate features mounting holes or apertures 140 through which bolts, screws, or other types of fasteners or threaded connectors can be used to secure the access device 100 to a wall of building. Further, one or more anti-tamper wire loops 150 are coupled to the access device 100 (e.g., such as to an antenna of the NFC tag 120, or representing anti-tamper wire loops of the NFC tag 120) and is designed to wrap around one or more of the fasteners, such as a threaded connector, that is used to secure the access device 100 to a building wall, such that if one was to forcibly pull the access device from the wall, it would pull the wire 150 from the NFC tag 120 which would render the device inoperable by altering or destroying its internal circuitry so the tag 120 can no longer communicate with an NFC reader and/or would tear the NFC tag at one or more of the zones of vulnerabilities that have been designed into a substrate of the NFC tag, thereby damaging the NFC tag and making it inoperable. In various embodiments, a control logic of the tag 120 is altered or deactivated as a result of the anti-tamper wire loop 150 being broken or decoupled from the NFC tag 120. Correspondingly, a strong adhesive 130 may also be used to create a strong bond between the anti-tamper wire loop 150 and the fastener around which is wrapped so that the act of pulling or ripping the access device 100 from the wall will result in the loop 150 breaking or will result in the NFC tag 120 being torn apart. Alternatively, or in addition to, in some embodiments, the act of breaking the anti-tamper wire loop may create an open circuit condition that is detected by the control logic of the NFC tag 120 and causes tamper data to be sent using the antenna of the NFC tag 120 to a backend server, where the tamper data indicates that the access device 100 has been tampered with.

Strong adhesives 132, such as adhesive glues, are also used to secure the front plate 102 to the NFC tag 120, such that if the front plate 102 is forcibly removed from the back plate 104, the NFC tag 120 will also be forcibly torn or pulled apart causing the tag to become inoperable. Additional adhesives or other fastening techniques may also be used to secure the front plate 102 to the back plate 104 in certain embodiments. Accordingly, in various embodiments, the NFC tag 120 is designed to be tamper proof such that the tag is rendered inoperable if removed from a mounting surface of the front or back plates and if the access device 100 is removed from a mounting surface of a building wall. It is noted that the external front plate does not provide access to the fasteners (e.g., threaded connectors) that are used to mount the access device 100 to a building wall, so the access device cannot be removed by simply unfastening or unscrewing the device 100 from the wall. In order to gain access to the fasteners, the front plate would need to be forcibly removed which will cause the NFC tag to be broken or ripped apart due to the strong adhesive that secures the NFC tag 120, at one or more zones of vulnerabilities, to both the front plate 102 and the back plate 104.

In various embodiments, an exemplary NFC tag 120 is also equipped with tamper detection capabilities. For example, if someone were to try to tamper with the NFC tag 120, the data residing within the tag would be modified accordingly. As such, each tap by a mobile phone would then generate an "invalid tap" attribute which a backend server would reject, resulting in a guest not being able to view the building directory and therefore will not be able to call a resident. A NTAG 424 DNA-type tag is an exemplary NFC tag with this type of functionality that is used in various embodiments.

Referring now to FIGS. 2-7, a series of user interface screens are shown to help illustrate aspects of the present disclosure. System features will vary for different personas or user roles, such as three primary users: Guests, Residents, and Property Managers). The following describes various non-limiting user experiences that are contemplated by the present disclosure.

First, in an exemplary implementation, residents can tap their phone on the display proximate to an NFC device embedded in the sign 100 to obtain entry, while guests can tap their phone (next to the NFC device embedded in the sign) to access a website or mobile app that allows them to view a building directory and call or message a resident to obtain entry. To do so, a front signage of the access device may contain instructions for a user to hold their NFC-enabled mobile phone near a defined location on the sign, as shown in step or sequence A of FIG. 3A. As discussed, in various embodiments, the access device 100 includes an anti-tamper wire 150, and is configured and installed in a manner such that attempts to remove the NFC tag 120 and the access device 100 from the wall it is installed on will break the anti-tamper wire 150 and/or an antenna of the NFC tag 120, thereby disabling it and preventing use following removal from the wall. Additionally, the NFC device 100 may also include designed vulnerabilities or weaknesses within a substrate of the NFC tag (e.g., a plastic or metal substrate) that are susceptible to tearing (along with electronic components attached to the substrate) upon application of a pulling or shear force on the sign. In various embodiments, an adhesive is used for securing the NFC tag 120 to a plastic substrate proximate the weakness area of the plastic substrate, wherein the plastic substrate comprises a first portion having a first force resistance strength value and a second portion corresponding to the weakness area having a second force resistance strength value, wherein the first force resistance strength value is greater than the second force resistance strength value. Accordingly, in various embodiments, the first portion has a first thickness and the second portion has a second thickness, such that the first thickness is greater than the second thickness. In various embodiments, the first force resistance strength value and the second force resistance strength value are tear strength values. In some embodiments, the first force resistance strength value and the second force resistance strength value are tensile strength values. In additional embodiments, the first force resistance strength value and the second force resistance strength value are yield strength values or shear strength values. The NFC tag 120 and the plastic substrate may be part of an inlay, where the inlay is secured by adhesive between front and back plates of the sign assembly. In certain embodiments, the adhesive comprises a first portion having a first force resistance strength value and a second portion corresponding to the weakness area having a second force resistance strength value, wherein the first force resistance strength value is greater than the second force resistance strength value. Accordingly, in certain embodiments, the adhesive comprises a first portion having a first thickness and a second portion corresponding to the weakness area having a second thickness, wherein the first thickness is greater than the second thickness. In various embodiments, an antenna of the NFC tag, the anti-tamper wire 150, or other circuit element may be disposed in the weakness area of the substrate of the NFC tag. As such, in certain embodiments, the substrate assembly comprises one or more channels defined in the plastic substrate that cause weakness of the weakness area.

In various embodiments, the access device's NFC tag 120 is capable of generating a new different distinguishable uniform resource locator (URL), along with a cryptographic signature, each time the NFC tag is in close proximity to an NFC reader, such as a mobile phone of a guest or resident, where the mobile phone has NFC reader capabilities. For example, a NTAG 424 DNA-type tag is an NFC tag with this type of functionality that is used in various embodiments.

Accordingly, such an NFC tag 120 can be embedded in a building directory signage, as shown in FIG. 2. Thus, when a guest taps on the signage with the user's mobile phone, the NFC tag 120 will generate a new different distinguishable URL, along with a cryptographic signature, where each NFC tag has its own authentication key. In various embodiments, the unique URL generated by the tag 120 along with the cryptographic signature is communicated to the user's mobile phone, which results in a browser of the user's phone sending the URL/signature to a backend server at the URL address. The backend server may then validate the cryptographic signature in order to check if it is real or forged. By validating the cryptographic signature, a proximity of the requesting user is verified to be in close range of the access device 100 (which is located at the building site). In various embodiments, a generated URL may have a format similar to www.access.abc/vc/<uuid>, where the UUID (universally unique identifier) is a random alphanumeric string generated by the NFC tag 120 and is specific to an access point in any given building.

Figure 3A:
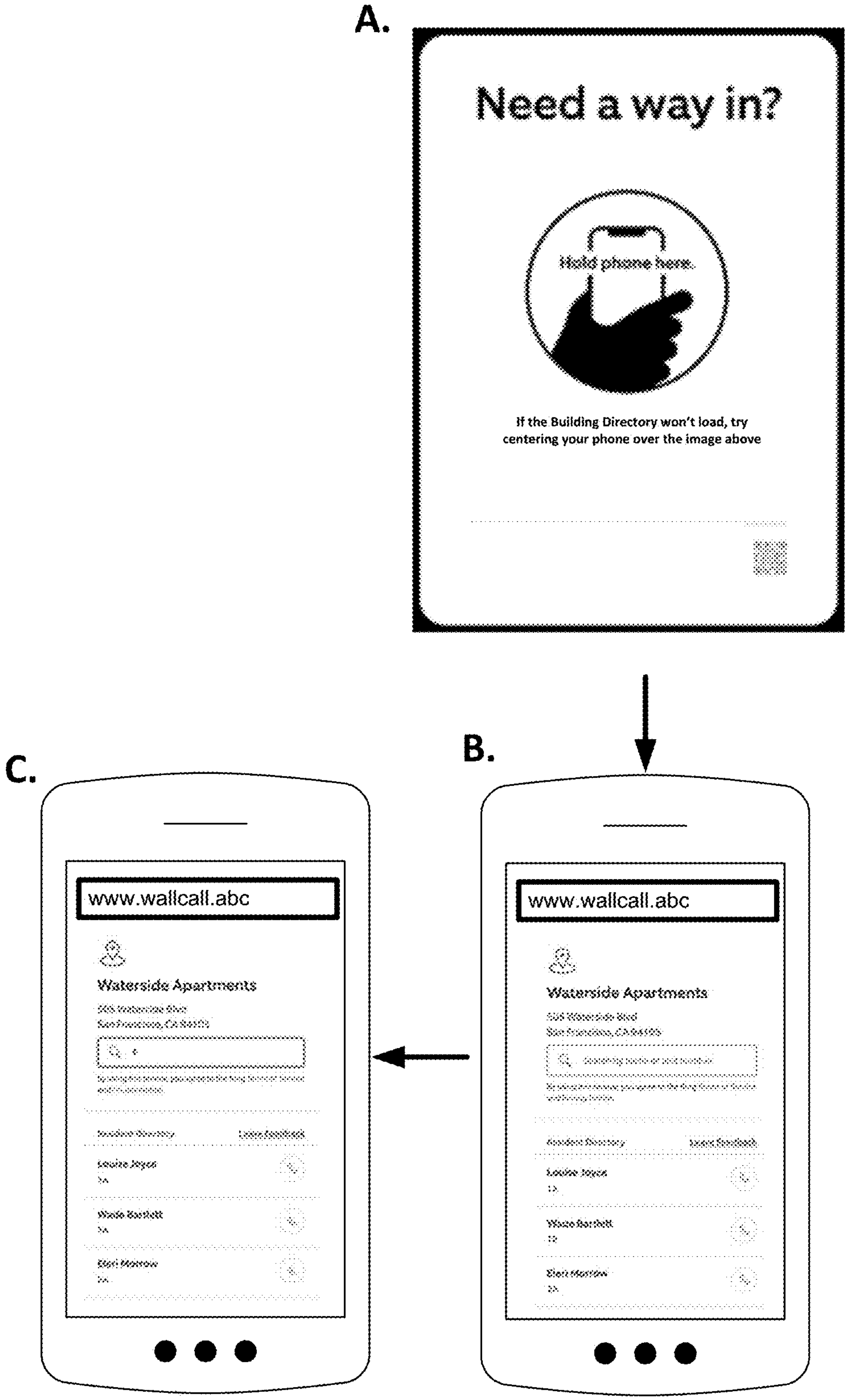
FIGS. 3A-3C, 4A-4D, 5A-5B, 6, and 7 show a series of user interface screens that illustrate aspects of the present disclosure.
Figure 3B:
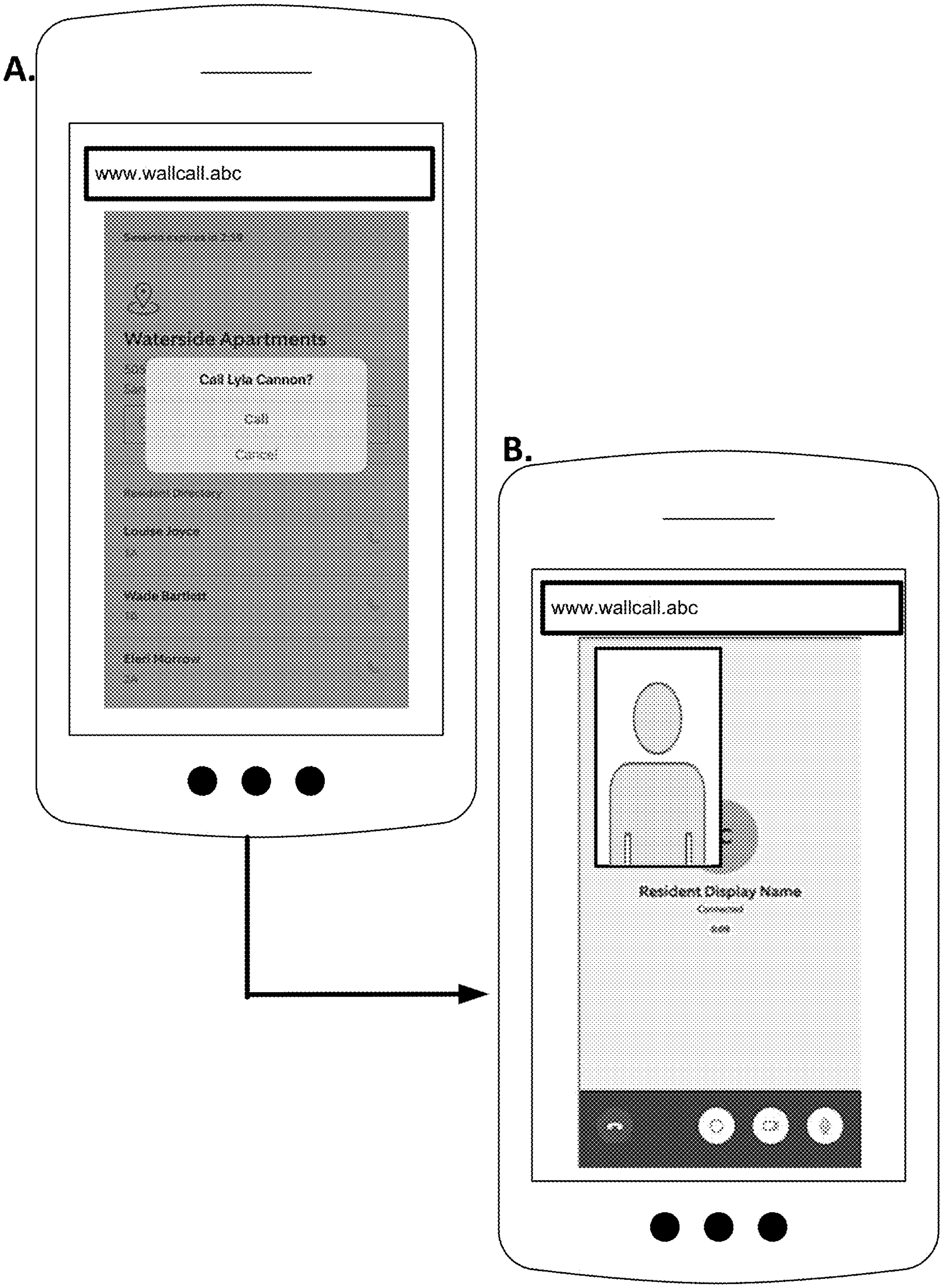
Figure 3C:
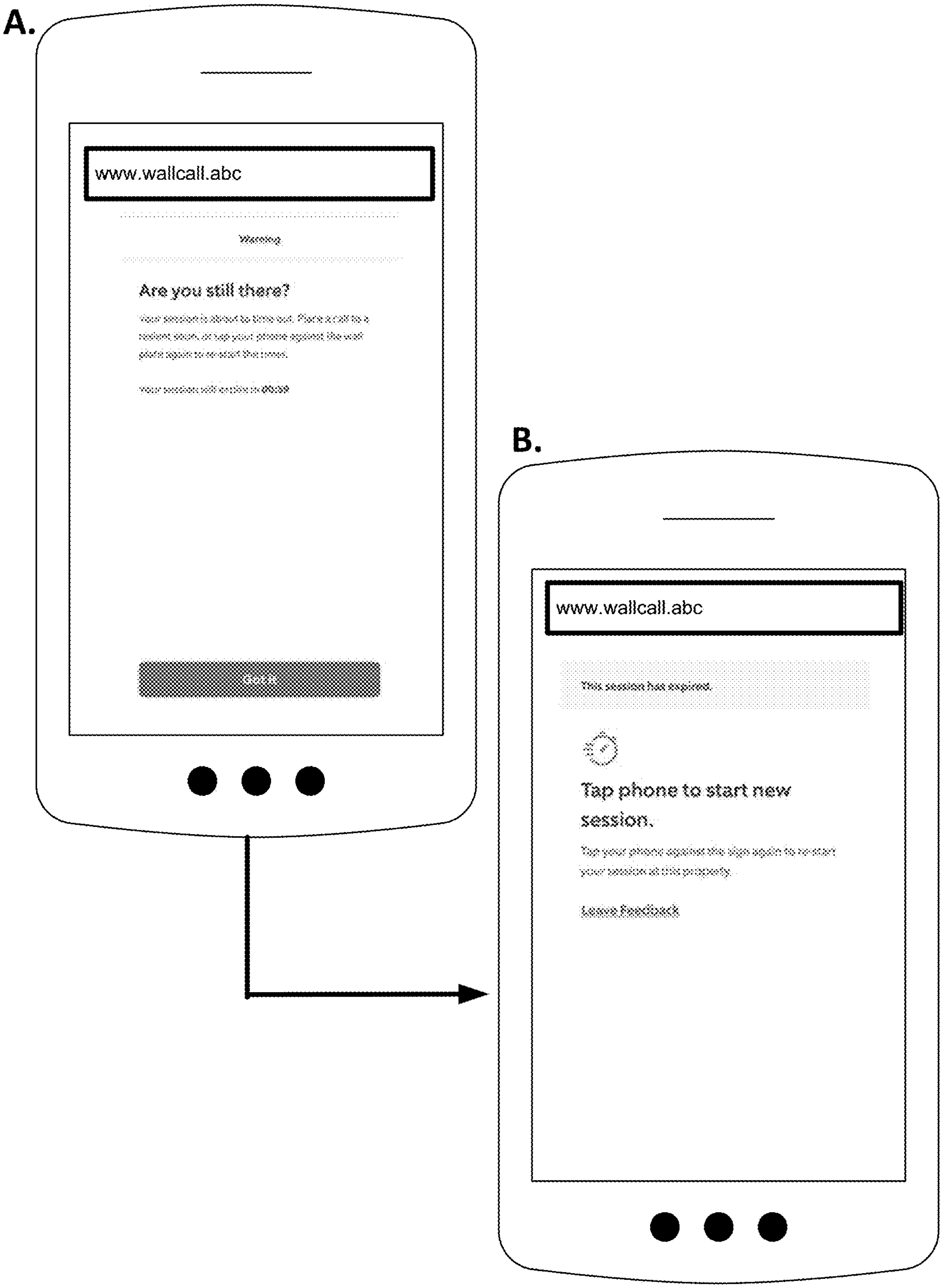

After successful NFC tap validation, the backend server re-directs the guest to the resident directory webpage with a 3 minute countdown timer (or some other short time period), as illustrated in step B of FIG. 3A. In various embodiments, the resident directory web page presents a user interface that shows: i) Building Directory or ii) Access Code input field. In various embodiments, an initial view of the user interface may also display details about the building property (e.g., name of the building (e.g. Windsor Towers), address of the building (e.g. 1260 Phinney Ave, Seattle, WA 98109)), along with the ability to use a virtual key present on the user's mobile phone (e.g., sent to an email address of the user from a resident) in addition to the building's directory and an access code interface.

In an exemplary embodiment, a building resident can install an access application on their mobile phone which allows the resident to use the application to send the virtual key via an invitation email to a guest access. Accordingly, the guest can follows instructions from the invitation to view the virtual key in their access app that is installed on their mobile phone. For example, by viewing the virtual key on the access application, the guest can see for how long the virtual key is valid for (start/end time, also referred to as a validity window), can clearly identify which location and access points the virtual key is valid for, and can see who shared the virtual key with them in the invitation email and the access application (name of resident). Using the virtual key, the guest can unlock an access point within the validity window, such as by tapping the NFC tag via the access application on the user's phone.

Alternatively, in certain embodiments, a resident can send an access code to the guest that can be input by the guest in an access code interface on a user interface page displayed on the user's browser. Thus, the guest is able to enter a valid access code (keyboard defaults to numerical numpad), where a valid access code is caused to open a locked door to an access point. In turn, entering an invalid access code does not open the door and presents an error message to the guest. In various embodiments, a countdown timer is initiated upon sending of the access code to the guest, such that upon expiration of the countdown timer, the guest can no longer enter the access point.

In various embodiments, the resident that created the access code receives immediate notification of access-code usage. Notifications includes snapshot image from guest's mobile phone, along with time stamp, and access point used. Event history log (timestamp, geocode, snapshot image of guest, access point entered) is visible to the resident in their access app if the access code was issued by that resident.

From the building directory, a guest can filter or search through the directory for a particular resident or unit number, as illustrated in step C of FIG. 3A. Then, the guest can place a call to and hold a call with the particular resident to seek access to a locked location at the building, as illustrated in step A of FIG. 3B. Here, in various embodiments, a guest can view themselves in the call session, but cannot view the resident. And, the resident can view the guest in their access application, as illustrated in step B of FIG. 3B.

In an exemplary embodiment, tapping on a "directory" link or button in the user interface shows a list of residents and/or the building unit numbers. The user interface can also provide a search box (e.g., with on-screen keyboard) that allows guest to filter the directory based on a name or unit number. Thus, a guest can select a resident's name and place a video call to a resident (internet based, IP call), in which the guest approves necessary permissions (microphone, camera) before the call can be placed. In various embodiments, the denying of camera permissions allows for a voice-based call to be placed, whereas the denying of microphone permissions does not allow for a call to be placed and presents the user with an error message. In this way, the guest clearly knows that their video is being streamed to the resident (e.g. call preview or an overlay simple text e.g. "Resident can see you . . . "). After the call ends, the session for that NFC tap expires even if there were X minutes left (e.g., where $0<X<3$ minutes). When the session ends, the guest cannot longer see or have access to the building directory. Thus, the guest is required to tap on the NFC tag again before being able to place another call to the resident or another resident.

An unsuccessful call is defined as a call where resident did not answer the call. For an unsuccessful call, the countdown timer does not pause while call has been placed or is in progress. After the unsuccessful call ends, the countdown timer continues as normal and does not expire. Thus, the session continues and the guest can still see the building directory. However, when the timer expires, the session ends and the guest is required to tap on an NFC tag to start a new session. The directory timer is reset to X minutes after tapping the NFC tag.

Once a call has been initiated within the countdown timer, the call is allowed to continue even if timer has expired. However, if the call is declined, or hung up, the guest is required to tap NFC again, and restart the call. The directory timer is reset to X minutes after tapping the NFC tag.

In various embodiments, a guest may leave a videomail or a text-based message for the resident when the resident does not respond to a call placed using the access service. For example, in certain embodiments, after X seconds of no-answer from a resident, a call to action to leave a videomail or a text-based message is provided to the guest such that clicking or tapping on a “videomail” user interface option or a “text message” user interface option allows the guest to record a YY second video or voice mail. Accordingly, the resident can be notified about the pending videomail or text message in their access application.

Correspondingly, residents can generally use the access application (that is installed on their mobile phone or tablet or personal assistants other user device) to interact with any guests who solicit access, or leave a text/video/voice mail. A resident may also use multi-modal Echo devices (i.e. with screen—Echo Show or FireTV) to interact with guests. The resident can then view a video stream transmitted from the guest’s mobile phone and interact and grant access to the guest. As discussed, the access application can create virtual guest keys and access codes for their guests. Additionally, residents can view a history log of when/who has accessed which access point (which door, side door, elevator, etc.) and how it was accessed (e.g. virtual key, access code, videocall, etc.), if the resident was the one providing access. Logs of other residents and building staff are not visible. Residents can control if their name is shown in the building directory. Thus, a resident can change their name displayed in the directory but still use an Unlock functionality for access points via the access application or can completely remove themselves from the access service.

The building directory allows the guest to interact with a resident via videocall. In response, the resident can unlock a door for the guest. A guest can also leave Text/Video/Voicemail if the resident does not answer. Frequent trusted guests (building staff, friends, family) may have a virtual key issued to them by the resident, and can use the access app to unlock doors using the virtual key. Infrequent guests (e.g. electricians, plumbers, food/grocery delivery drives) may also have a one-time access code (provided by a resident or the property manager for the building), which they can use to unlock the door in a given time frame.

In various embodiments, a countdown timer is used to ensure that guests are not simply walking away while keeping the webpage active. Once a guests hang up a call with a resident or if the timer simply runs out—the guest’s browser instructs the user to tap on the NFC signage again to restart a new session, as shown in steps A and B of FIG. 3C. For building residents, the same underlying technology can be used to gain access to building areas.

In an exemplary embodiment, a building resident can use the access application to tap on the NFC tag embedded in the building directory signage and retrieve the unique URL and cryptographic signature and relay the URL/signature in addition to a unique identifier generated by the access application that identifies the user as being a resident of the building. Once verified as being a resident, the backend server can signal an electronic lock to open and allow for the resident to enter a controlled access area of the building. Accordingly, in various embodiments, residents can set time restrictions for NFC taps. For example, residents may set time periods for when they do not want their name to be shown in the directory which would prevent visitors from contacting residents using the access service.

While existing callbox systems are cost-prohibitive or lack features for their residents and visitors, an exemplary access device is a mobile phone-based access control solution that offers an upgraded ‘smart’ access experience for two cohorts: 1) buildings with existing telephony-based callboxes that do not address pinpoints cited by residents, property managers, and guests; and 2) buildings with no existing electrical-access that rely on physical mechanical keys for entry and are looking to upgrade their offering. In various embodiments, the access device and related services uses NFC technology in combination with existing security access technologies to enable the experience for various personas in these buildings, such as, but not limited to, Amazon Key’s LeoLite IoT access-control hardware and the Ring infrastructure including Ring App, associated communication services over audio, video and its integration with Alexa smart home skills, etc.

Accordingly, an exemplary embodiment of the access device and related services includes features that give the ability to 1) view one-way video feed from the guest’s mobile phone camera, 2) grant time or usage-bound access to enter a building (Virtual Keys), 3) received video voicemails from guests, and 4) manage/edit resident data for the property owner with further integrations with 3P rent management software so that property owners can seamlessly manage access for their properties as residents move in and out. In this way, an overall access system is an access-control system that can allow residents and/or guests to access not only enter their building’s front door, but also their elevators, amenity rooms (gym, pool, business center, etc.), package rooms, building garages, storage lockers, mailboxes, etc. While the access system can provide access to common-spaces in a building, pairing it with smart locks (installed at building units) can also allow for property owners to enable self-guided tours for prospective tenants, and short-term rentals (aka a “curb-to-couch” experience”), in various embodiments.

In general, the access system extends/creates callbox functionality by building a suite of features for: 1) guests to request access via their mobile phone by tapping their phone at the building entrance, 2) residents to authenticate (and provide access to) guests through a video stream (e.g., 1-way video stream) from the guest’s mobile phone, 3) property managers/owners (PMO), to audit building access and effortlessly manage their residents that use access. Features can overlap between these personas—for example a property manager can create guest access (virtual key) for their staff, and a resident can do the same for other guests.

In various embodiments, access-enabled buildings feature access control devices to electronically lock and unlock doors. As such, access assemblies can be installed at existing electrical access-restricted buildings that wish to replace existing callboxes or at buildings that traditionally use physical-keys but wish to upgrade their doors with a cloud-based access-control system by electrifying their locks at access points.

In various embodiments, to register or enroll in the access service, a resident can install the access application and use their email address supplied to building management (e.g. property manager) to register for their building’s access service. The access application may then guide and educate the resident on features of the access service, as illustrated in steps A and B of FIG. 4A. If the user's email has not been registered or some other issue is preventing a successful enrollment, the access application can notify the user, as illustrated in step A. Otherwise, the user is provided the option of enabling access features on their user communication device (e.g., mobile phone), as illustrated in step B of FIG. 4B.

Figure 4A:
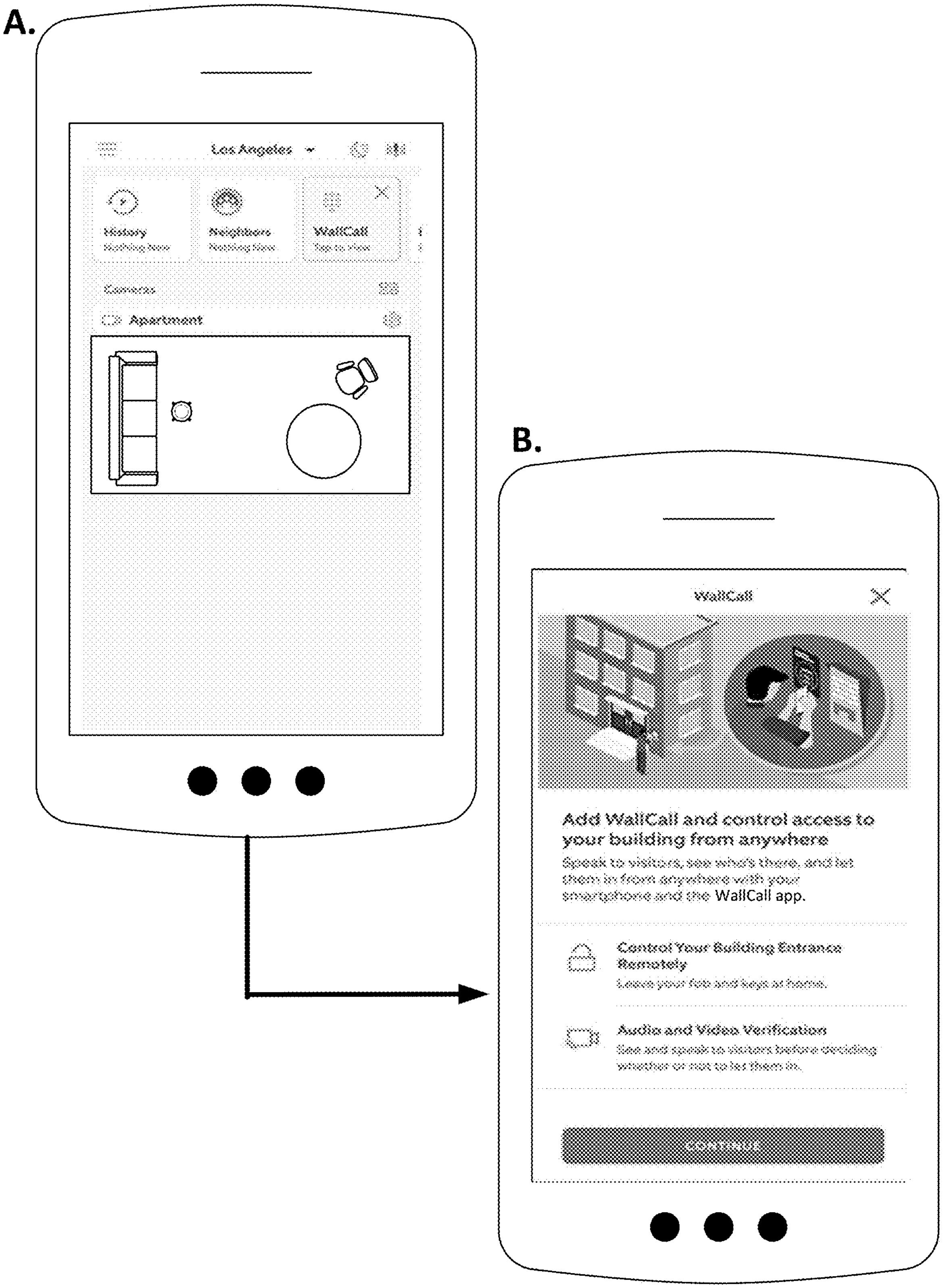
Figure 4B:
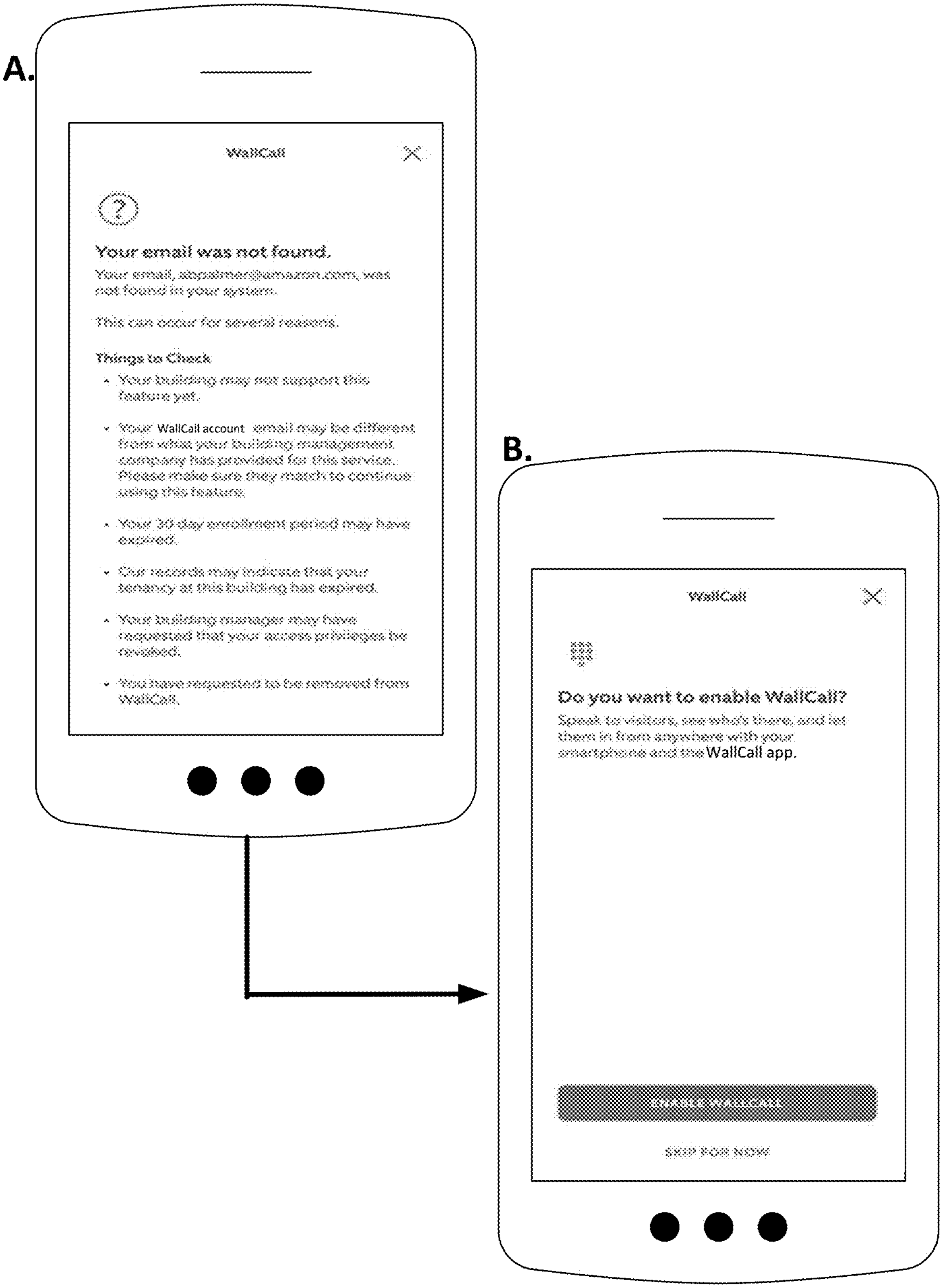
Figure 4C:
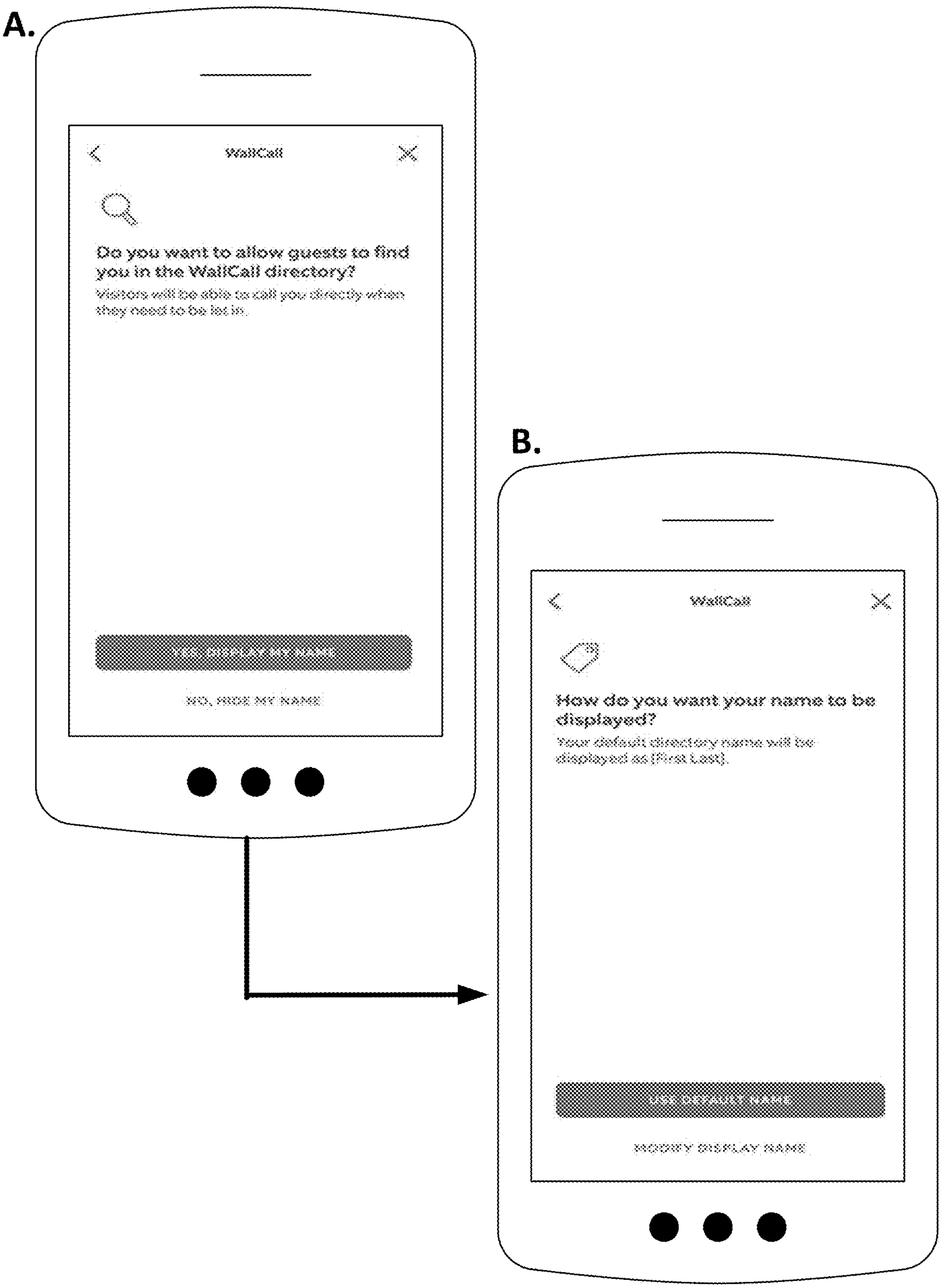
Figure 4D:
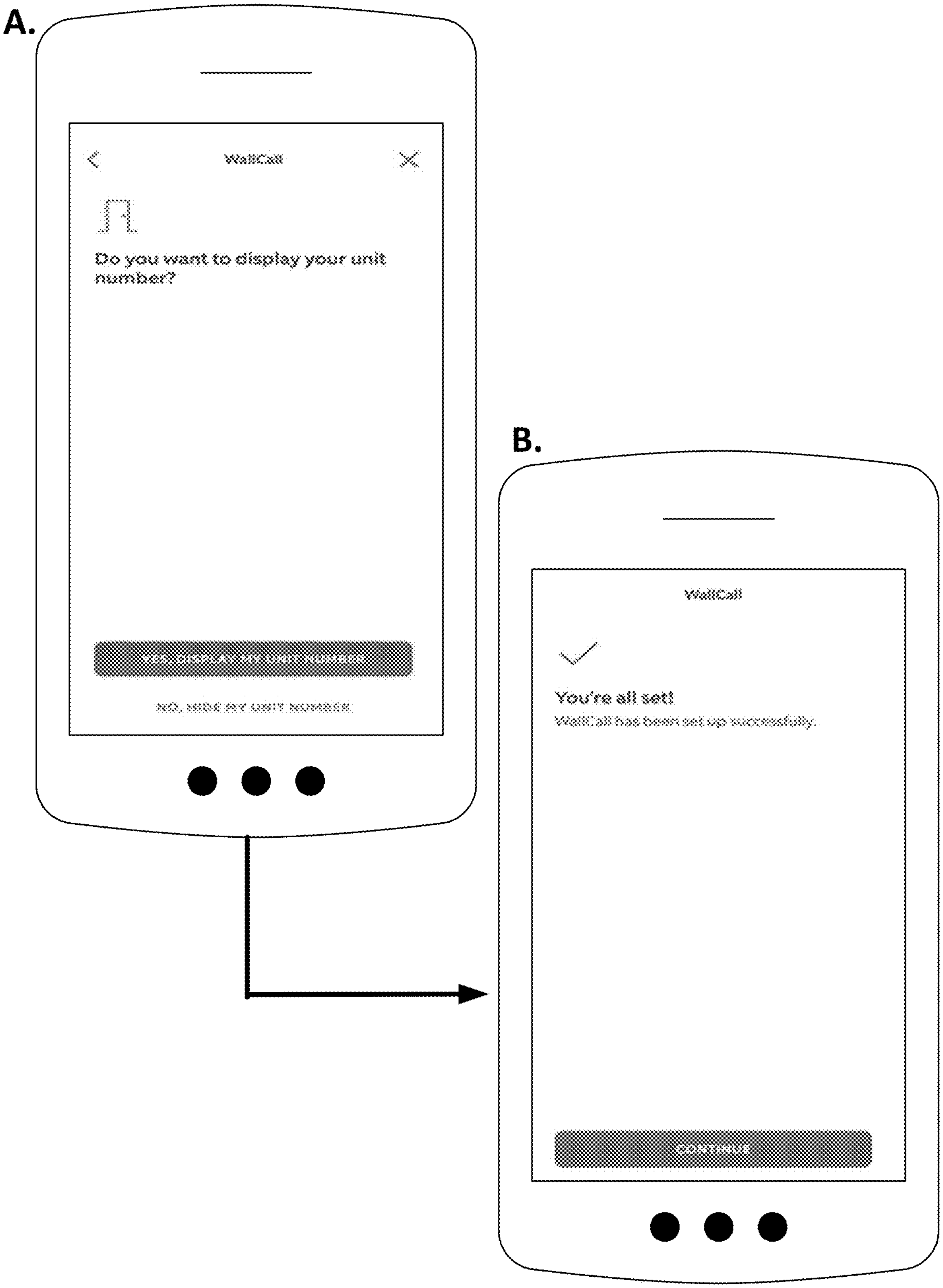

For the listings in the access directory listing, the resident can choose whether to show their name or not in the building directory and can choose how their name is identified (e.g., resident's legal name may not be the name their preferred name) by specifying their preferred name in their access application, as illustrated in steps A and B of FIG. 4C. Additionally, the resident can choose whether to hide or show their unit number in the directory, as illustrated in step A of FIG. 4D. After the resident has inputted the necessary information, a confirmation screen is shown on the access application of the user's communication device, as illustrated in step B of FIG. 4D.

Figure 5A:
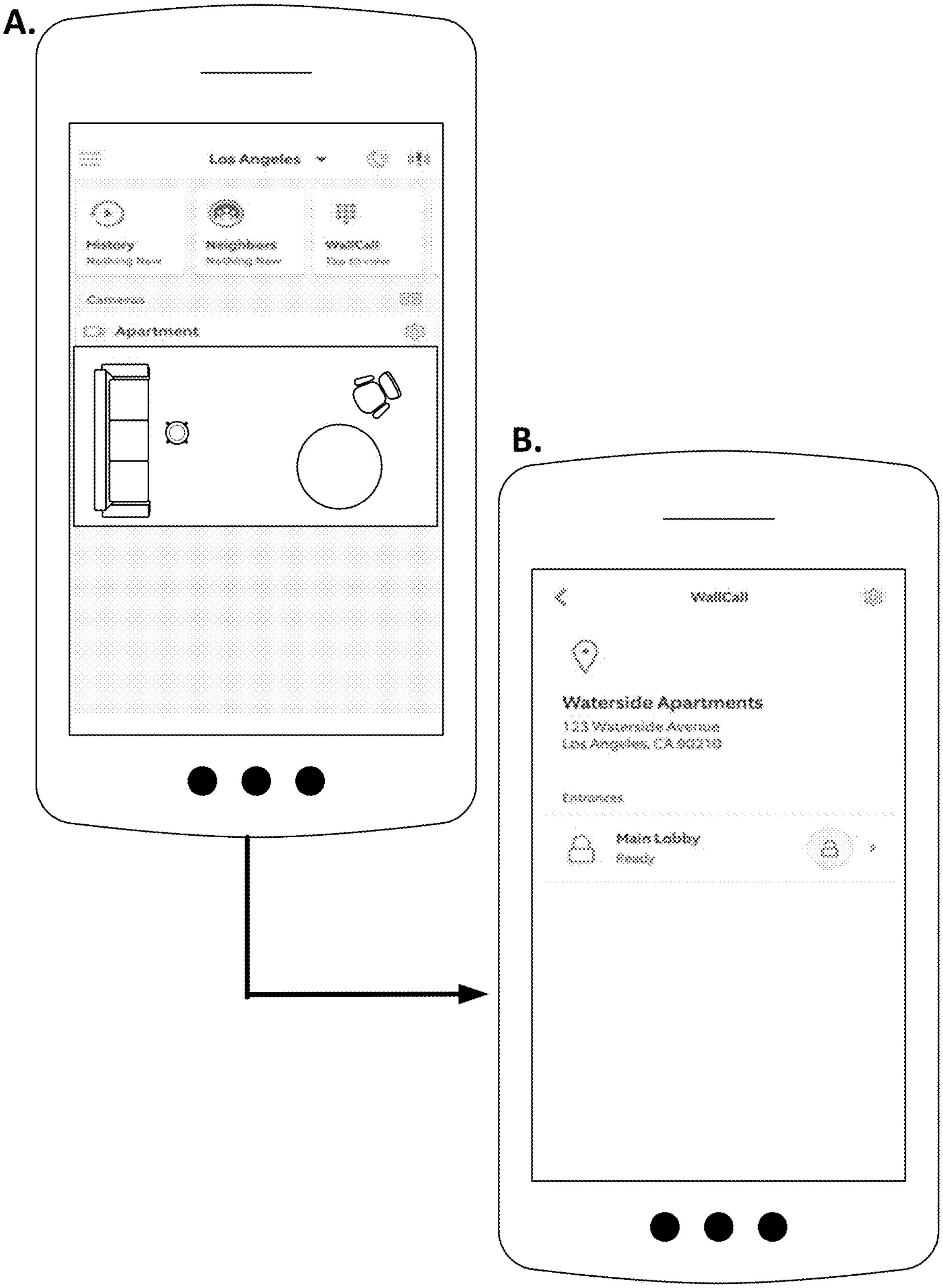
Figure 5B:
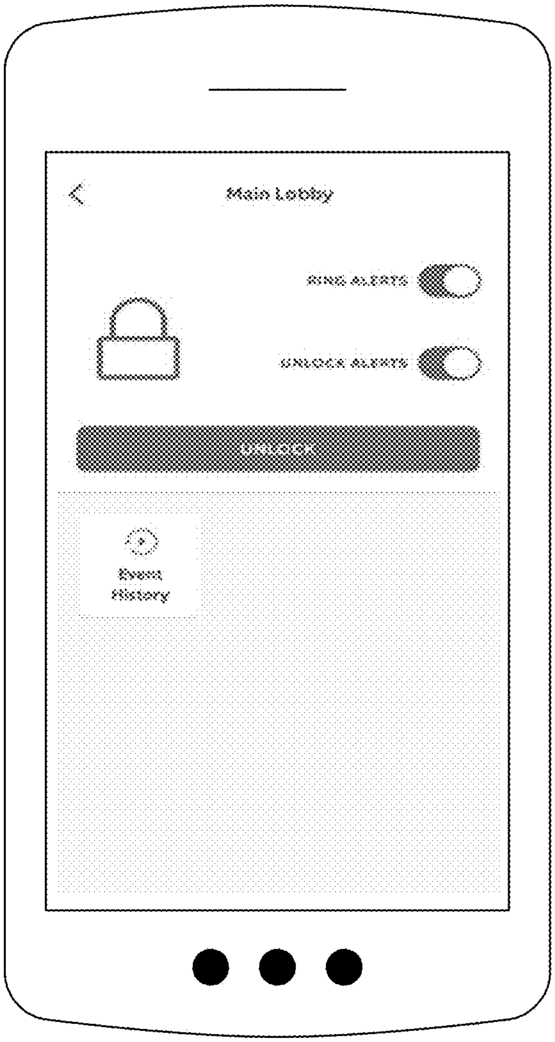

After enrolling, when the resident logs into the access App, a access dashboard interface is available to the resident user, as illustrated in step A of FIG. 5A. Via the dashboard interface, the resident can view details about the building, such as the street address (e.g. 123 Main Street) and building name (e.g. Wallington Towers), as illustrated in step B of FIG. A. In addition, the resident can view event history and performing certain actions, such as creating virtual keys (guest keys), creating access codes, viewing a neighborhood map showing access points, etc. In addition to creating access codes and virtual keys, the resident can also unlock a door at an access point within their building directly from the access application dashboard, as illustrated in FIG. 5B. Upon unlocking a door, a countdown timer is initiated for a set duration before the lock is reset that is visible to the resident.

In accordance with various embodiments, a resident can be enabled to open various access points within a building location using the access application, such as a building's elevator or any amenity room (gym, pool, business center, etc.), if the building or property manager has enabled such access for the resident. Accordingly, upon unlocking a door, a countdown timer is initiated for a set duration before the lock is reset that is visible to the resident.

Figure 6:
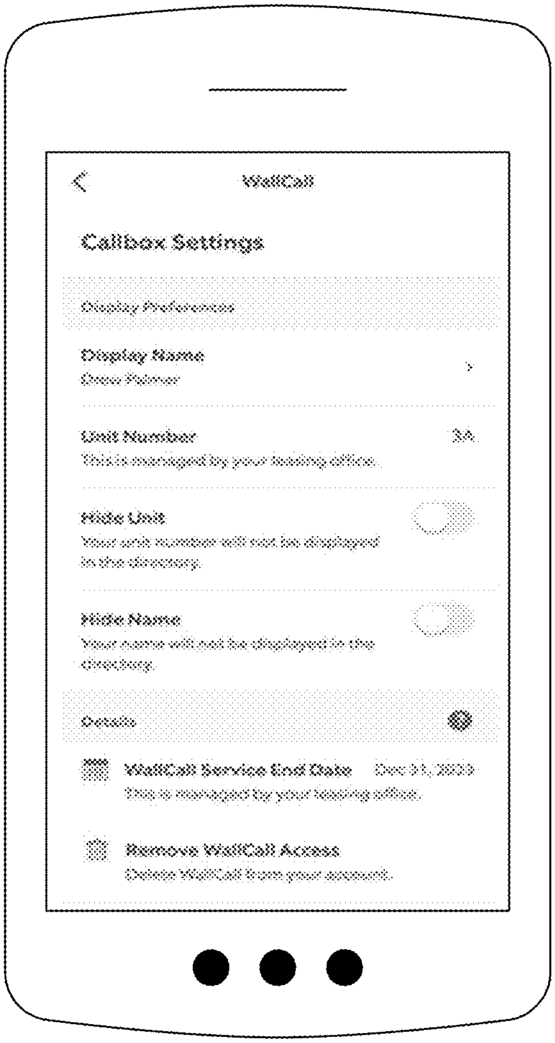

After enrollment, for the listings in the access directory listing, a resident can change how their name is identified (e.g., resident's legal name may not be the name their preferred name) by specifying their preferred name in their access application, as illustrated in FIG. 6. Accordingly, a name associated with their access application is the name user for the directory listing. Correspondingly, a resident can opt out of having their name displayed in the access building directory by specifying that the name should not be included using their access application. For example, the access application may feature a toggle control that can turned off to indicate that the user does not want to be included in the access directory listing. Additionally, in certain controls, additional toggle controls may be provided that allow for the user to be included in the directory listing but not have their unit number to be included in the directory listing.

Figure 7:
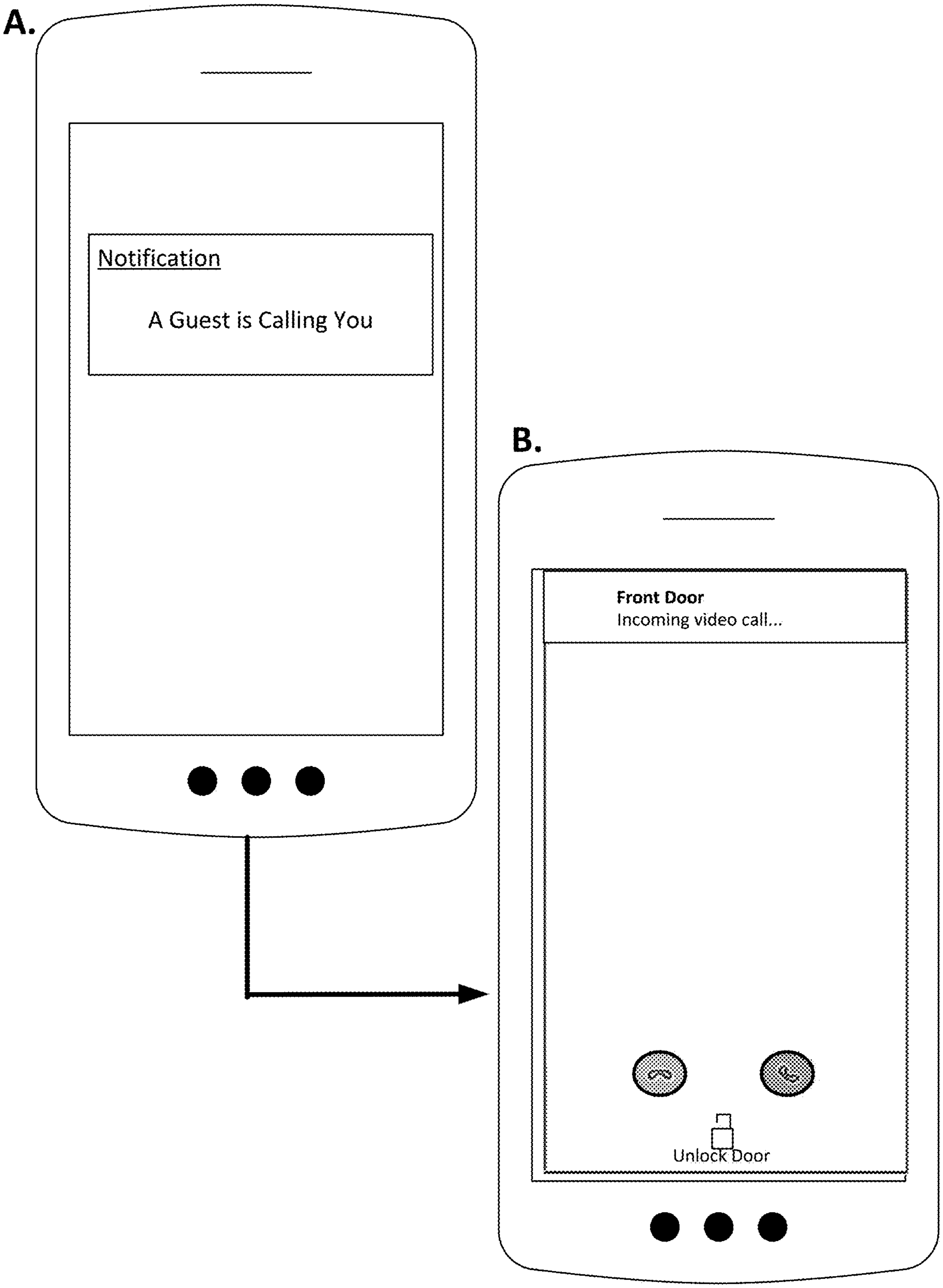

For interactions with a guest, the resident can receive a notification message on their access application when the guest is onsite and is attempting to call the resident using the building directory for the access service, as illustrate in step A of FIG. 7. In various embodiments, the notification shows the name of the access point where the guest is calling from and provides quick reply buttons to answer the call, decline the call, or unlock the access point. An event log is created for the resident detailing the call that is available for viewing by the resident. In certain embodiments, the notification can also show a snapped static image of the guest (e.g. first frame with a face of video call).

Using the access application, the resident can answer the incoming call, as illustrated in step B of FIG. 7. For the call, the access application can show a live video feed from the guest's mobile phone and can provide action buttons for unlocking the access point, ending the call, switching audio feed between handset or speakerphone, displaying a time indicating how long the call has been active for (mm:ss), providing the option to on/off a video-feed from the resident's mobile phone's camera so that the guest can/can't see the resident, providing the option of muting the audio during the call, providing the option of ending the call, etc. Accordingly, to answer the call, the resident has several options that include answering the call using an external speaker of the user's communication device (e.g., speakerphone) so that the user does not have to hold the user's device to their ear. Or, another option is to use an internal speaker and to hold the device to the user's ear.

As discussed previously, in various embodiments, a resident has the ability to create a time-bound virtual/verified guest key for an access point in the property to share with guests using the access application. Accordingly, a resident can use the access application to create virtual/verified guests keys by selecting one access point in the building for a virtual key (e.g., front door of building), selecting the hours and days in which the virtual key will be operable, entering an email address to share the virtual key with (or entering multiple email addresses for sharing the virtual key), such that a guest will receive an email when the virtual key is shared with them and the virtual key is operable using the guest's access application. In an event log for the resident, the resident can see which virtual keys are active/inactive including time they were issued, the recipients of the virtual key, and access points that were granted access. The resident also has the capability to revoke any virtual/verified guest key that they had created by selecting the virtual key and deleting it using their access application. In turn, the guest will no longer be able to see (and use) the virtual key in their access application.

In various embodiments, whenever a virtual key is used by a guest, the resident that issued the virtual key receives a notification on their access application. The notification can include a snapshot image from the guest's mobile phone, a time stamp, and access point used. An event history log (timestamp, geocode, snapshot image of guest, access point entered, etc.) may also be visible to the resident in their access application.

Additionally, in various embodiments, a resident has the ability to create a limited-use access code so that it may be shared with guests that may not use the access application or have access to a mobile phone, which can include delivery drivers. Accordingly, via a resident's access application, the resident can select eligible access points that can be opened with an access code and can select a time period or frequency for which the access code is valid. In various embodiments, the frequency is only 1 time use. In certain embodiments, a random access code is generated automatically by the backend server and supplied to the guest via the resident's access application. In other embodiments, the access code may be copied and pasted into a message sent to the guest external to the access application, such as in an email or text message.

However, the access code can be revoked by the resident using their access application. Further, the resident can view which access codes are active/inactive including the time they were issued, the recipients of the access codes, and the associated access points using their access application. By selecting one of the displayed access codes and deleting it, the access code can be revoked by the resident. The affected guest may then be presented with an error message if they try to use the access code to unlock a door at an access point.

In various embodiments, whenever an access code is used by a guest, the resident that issued the virtual key receives a notification on their access application. The notification can include a snapshot image from the guest's mobile phone, a time stamp, and access point used. An event history log (timestamp, geocode, snapshot image of guest, access point entered, etc.) may also be visible to the resident in their access application.

Regarding event logs, a resident can view activity (event) logs regarding activity initiated by their account, where the event log can contain a list of all access point unlocks performed by the resident from their mobile phone, contain a list of all access point unlocks performed by their guests with whom the resident shared a guest key (Virtual Key) or an access code, indicate the method of unlocking the access point: (e.g. Unlock button in app or Guest Key or One time passcode), show the timestamp (day and time), show the name or location of access point, etc. where the event log is visible for a set amount of past events or for a set amount of time. In certain embodiments, the event log can include additional details, such as status of an unlock event (success/fail), mode of access grant (access code or video call or phone call, etc.), links to video calls or snapshot images of guests, list of missed calls that were not answered and had no video/voice mail, links to videomail recordings, options to delete items from the event log, etc.

For property managers, they can use a Property Manager Portal (PMP) site to manage a resident's listing and access with respect to the Building directory that is provided by the access services. In various embodiments, the access service is integrated with rent management tools (Entrata, Yardi, RealPage, etc.) via an API which can push out access invitations to incoming tenants, or automatically revoke resident access as they move out (e.g. lease expires). A self-serve manual interface is also available for those not using existing lease/rent management software. Via the portal site, a property manager can perform a variety of administrative functions, such as adding other staff members with administrative permissions; creating virtual keys for maintenance staff (keys without further share capability); viewing metrics/dashboards about their property or building; viewing a history log of who was granted access, who accessed which access point (which door, side door, elevator, etc.) and how it was accessed (e.g. virtual key, access code, videocall); and adding other users as staff members, where staff members may or may not have further downstream share privileges).

In various embodiments, using the access portal site or Property Manager Portal (PMP), a property manager can log in and out of the Property Manager Portal (PMP). Accordingly, after signing into portal, the property manager may be presented with a user interface to upload resident details. For example, the portal may have a button for downloading a blank template of a CSV file that contains 3 columns titled "resident_email," "resident_aptnumber," and "expirydate_mm/dd/yy" such that the property manager can add details about the resident(s) to the file (e.g., metadata about the resident, such as first name, last name, middle name, etc.) and uploaded to the backend server for inclusion in the access service, where occurrence of the expiry date ("expirydate_mm/dd/yy") can disable access for the resident to the access service. Likewise, the property manager can remove a resident from the access service by selecting a record associated with the resident and selecting a deletion option provided by the PMP. Deletion of the record will cause certain operations of the resident's access application to be disabled. Alternatively, the property manager may also delete a resident by uploading a new CSV file with the list of residents participating in the access service that does not include the resident.

Similarly, the property manager can edit or change resident information using the PMP site, such as by selecting a record associated with a particular resident and then selecting an editing option provided by a PMP interface. For example, the property manager may be able to change a unit number for a resident, change an expiry date for a resident, change an email address for the resident, etc. Alternatively, the property manager may also change an email for a resident by uploading a new CSV file with the list of residents participating in the access service that does not include the record entry with the former/old email address and includes a new record entry with the new/updated email address.

In various embodiments, a property manager can view details on the residents using the PMP site, such as a list of residents who have been invited and have onboarded to access, and have the option to download the latest set of residents for the building property. The PMP site may also provide options for creating virtual keys/guest access codes for their staff, maintenance desk, etc., for viewing dashboards/metrics about their property—# of calls, # of door releases, # of active units, users using access via mobile, granted virtual keys, delivery authorizations, audit trails, etc.

Figure 8:
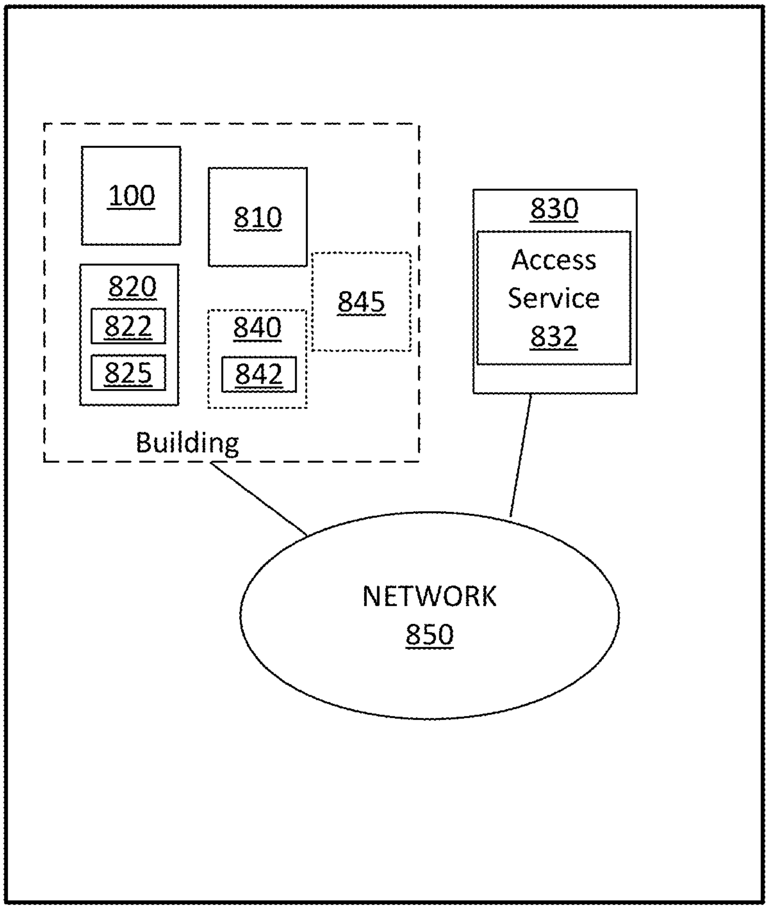
FIG. 8 illustrates an access environment that utilizes an access device of FIG. 1.

FIG. 8 an access environment or system that utilizes a access device 100. The access environment 800 includes a security lock system 810 for a building that includes a remote controlled lock on a building door. However, while a building with a locked door is one example of an access point that can be controlled with the access environment, the embodiments herein can be used with any type of secure location such as an apartment building, an office building, a warehouse, a gated community of houses, a fenced property, and the like. Instead of the door, the secure location may include a locked gate, dock door, or a storage box for holding packages. For example, rather than using a security lock system 810 to enter into the building, a user, such as a resident, can use the security lock system 810 to unlock a box where a guest, such as a delivery person, can place a package for delivery. Further still, the security lock system 810 is not limited to delivering items but can be used to provide general access to trusted individuals or guests (e.g., a friend coming to visit a resident who lives in the building).

The access device 100 enables a NFC reader 822 on a mobile device 820 to interrogate an embedded NFC tag 120 within the access device 100 and retrieve a building directory from a backend server 830 that performs various access services 832, such as, but not limited to, servicing requests received from access client applications and client browsers, as disclosed herein. Because the NFC tag has limited range, the NFC reader can receive an URL and a signature for retrieving the building directory only if the mobile device 820 is at the building (e.g., within inches of the access device 100). Thus, in FIG. 8, the access device 100, the security lock system 810, and the guest mobile phone 820 are shown as having solid lines within the confines of the building, which is meant to indicate that they are intended to be onsite at the building location. On the other hand, the resident user communication device 840 and the property manager user communication device 845 do not need to be onsite in order to interact with the backend server 830 or other access-related devices. Therefore, these devices are shown with dashed lines to indicate that these devices can be located inside or outside the building location.

The mobile phone 820 of a guest at the building access application transmits the URL and signature received from the access device 100 to the backend server 830 using, e.g., wireless communication such as a Wi-Fi or cellular network. The backend server 830 authenticates the signature and URL and transmits a building directory webpage to the mobile phone 820 of the guest upon successful authentication. Using a browser 825 on the mobile phone 820, the guest can select a listed name of a resident in the building directory and can initiate at least a 2-way audio call to a communication device 840 of the resident (e.g., an internet or cellular enabled mobile phone, tablet, personal assistant device, etc.) requesting for the resident to allow the guest to enter a locked location within the building, where the call is received via a access application 842 on the user communication device of the resident. Alternatively, a 1-way video and a 2-way audio call may be initiated or a 2-way video with a 2-way audio call may be initiated. During or after the call, the resident can provide the guest access to the building by unlocking a remote controlled lock at an access point using their access application 842 to communicate with the backend server 830 and signal the security lock system 810 to open the lock.

For example, the remote controlled lock may be an Internet-of-Things (IoT) device which is communicatively coupled to the security lock system 810. In another embodiment, instead of unlocking the lock, the access application 842 can request the backend server 830 to command the security lock system 810 to transmit an access code to the guest's mobile phone 820, which the guest can used to gain access to the building.

In addition to guest(s) and resident(s), administrative personnel, such as a building property manager and staff, can also interact with access services 832 through their user communication devices 845 to manage who has access to the access services and related building directory offerings. In various embodiments, to aid in administration of such tasks, the backend server 830 provides a property manager portal site that can be accessed via the user communication devices 845.

Network 850 communicatively couples the mobile device 820, the user communication devices 840, 845, the security lock system 810 to the backend server 830. The network 850 can include one or more public networks (e.g., the Internet), cellular networks, or Wi-Fi networks (e.g., a Wi-Fi network at the secure location).

Communication between the guest and the resident may be facilitated by the backend server 830. Accordingly, communications, messages, transmissions, etc. between the mobile phone 820 and the user communication device 840 (and between any other devices shown or described herein) may be routed through the backend server 830. For example, video data captured by the mobile phone 820 may be transmitted to the server 830 through the network 850, then transmitted from the server 830 to the user communication device 840 through the network 850. Other data may be similarly transmitted between any of the devices disclosed herein.

For example, communication may include audio data being captured by a microphone of each of the mobile phone 820 and the user communication device 840, transmitting the respective audio data captured at each device, and each device causing the audio data received from the other device to be output on a speaker. Accordingly, both devices have a role in the communication, so both devices are considered to have a part in initiating any two-way communication. Similarly, one or both of the devices may capture video and/or image data that can be transmitted and/or output as part of the communication.

The backend server 830 may comprise a computer program or other computer executable code that, when executed by processor(s) of the backend server 830, causes the backend server 830 to wait for requests from other computer systems or software (clients) and provide responses. In an embodiment, the backend server 830 shares data and/or hardware and/or software resources among the client devices 810, 820, 840, 845. This architecture is called the client-server model. Such client devices may connect to the backend server 830 over the network 850. Examples of computing servers include database servers, file servers, mail servers, print servers, web servers, game servers, and application servers. The term server may be construed broadly to include any computerized process that shares a resource to one or more client processes.

Figure 9:
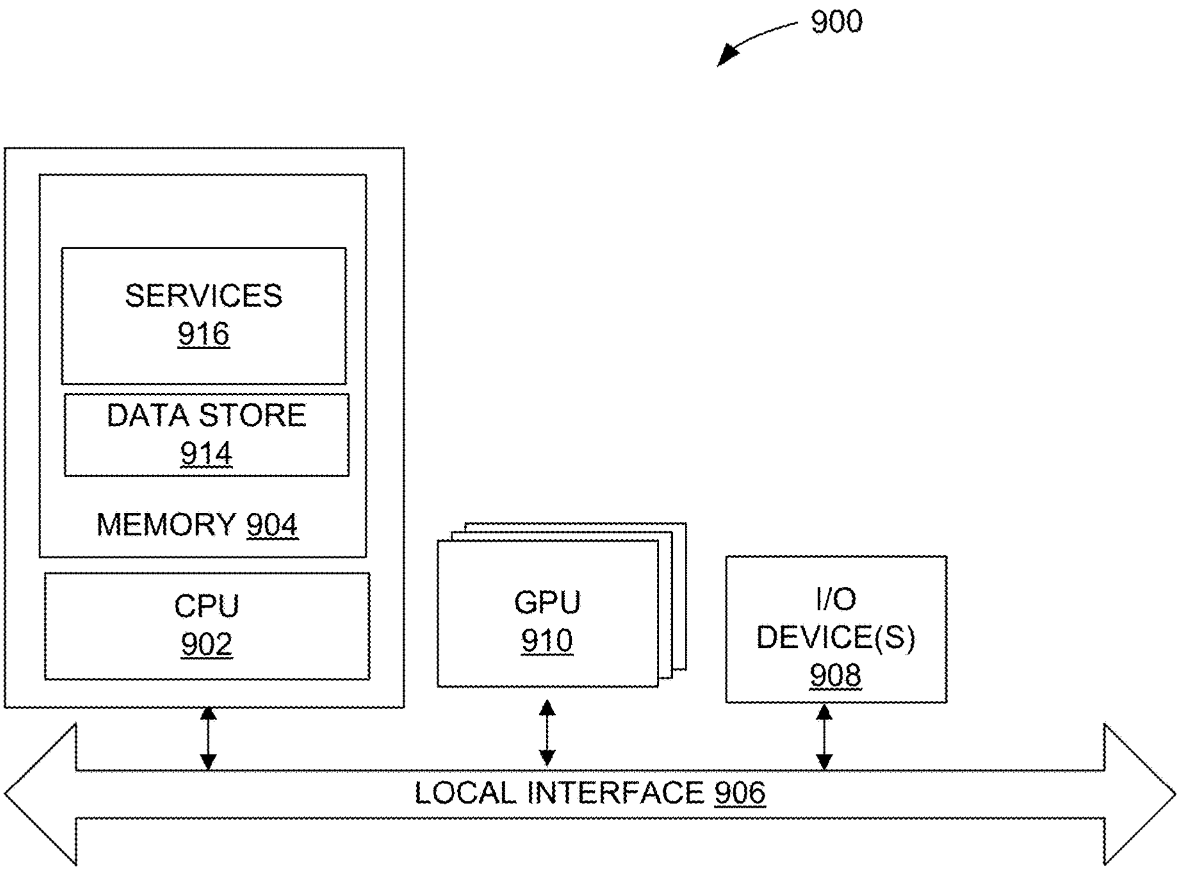
FIG. 9 depicts a schematic block diagram of a computing device that can be used to implement various embodiments of the present disclosure.

FIG. 9 depicts a schematic block diagram of a computing device 900 that can be used to implement various embodiments of the present disclosure, such as the backend server or a component of a backend server platform that may be within a cloud computing infrastructure, in addition to various client devices. An exemplary computing device 900 includes at least one processor circuit, for example, having a processor 902 and a memory 904, both of which are coupled to a local interface 906, and one or more input and output (I/O) devices 908. The local interface 906 may comprise, for example, a data bus with an accompanying address/control bus or other bus structure as can be appreciated. The computing device 900 may further include Graphical Processing Unit(s) (GPU) 910 that are coupled to the local interface 906 and may utilize memory 904 and/or may have its own dedicated memory. The CPU and/or GPU(s) can perform various operations such as image enhancement, graphics rendering, image/video processing, and any of the various operations described herein.

Stored in the memory 904 are both data and several components that are executable by the processor 902. In particular, stored in the memory 904 and executable by the processor 902 are code for executing access functions or services 916 (e.g., access services 832). Also stored in the memory 904 may be a data store 914 and other data. In addition, an operating system may be stored in the memory 904 and executable by the processor 902. The I/O devices 908 may include input devices, for example but not limited to, a keyboard, mouse, etc. Furthermore, the I/O devices 908 may also include output devices, for example but not limited to, a printer, display, etc.

Figure 10:
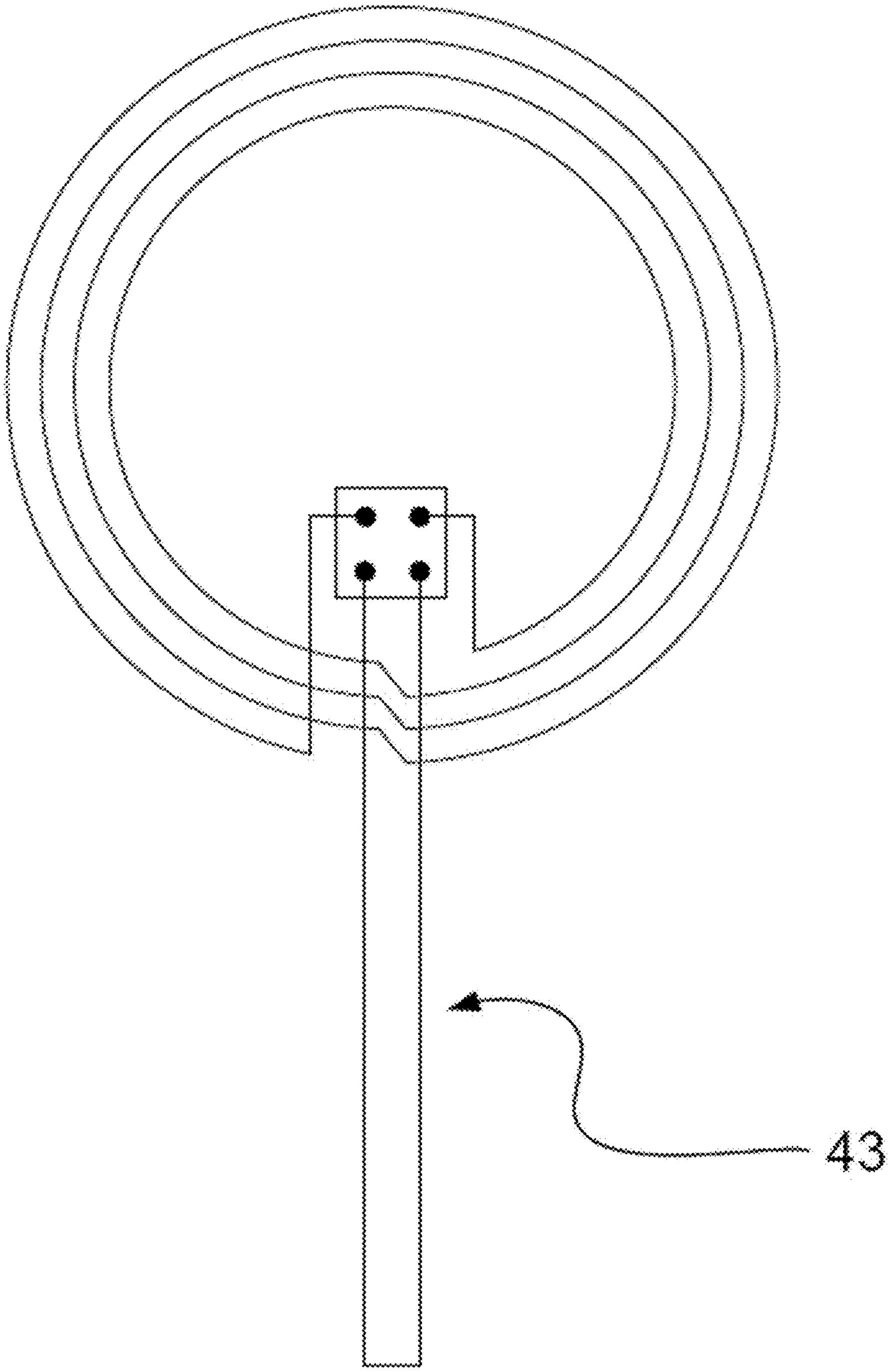
FIG. 10 illustrates an exemplary near field communication (NFC) tag including an anti-tamper wire in accordance with various embodiments of the present disclosure.

As discussed herein, in accordance with one or more implementations, an NFC tag used in a device comprises an anti-tamper wire or loop, and is configured and installed in a manner such that attempts to remove the NFC tag or remove the device from a wall it is installed on will break the anti-tamper wire and/or an antenna of the NFC tag, thereby disabling it and preventing use following removal from the wall. FIG. 10 illustrates an exemplary NFC tag including such an anti-tamper wire 43. In a preferred implementation, this is implemented using an adhesive film or covering that covers and adheres to the NFC tag such that removal of the film will break the anti-tamper wire and/or an antenna of the NFC tag and/or a substrate & electronic components attached thereto of the NFC tag.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, a user can access any of the resources that reside in the cloud at any time, and from anywhere across the Internet. In context of the present disclosure, a user may access applications or related data available in the cloud. For example, the backend server could be executed on a computing system in the cloud.

It should be emphasized that the above-described embodiments of the present disclosure are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure and protected by the following claims.

What is claimed is:

1. A computer-implemented method, comprising:

sending, by a first short distance wireless communication component of a mobile device, a first signal to a second short distance wireless communication component of a second device, the second device corresponding to an access point of a building;

receiving, from the second short distance wireless communication component, a second signal including a first uniform resource locator (URL) and a cryptographic signature;

sending, by a third wireless communication component of the mobile device, a third signal to a server associated with the first URL, the third signal including the cryptographic signature;

receiving, by the third wireless communication component of the mobile device and from the server in response to the third signal, a fourth signal including data corresponding to a directory of residents of the building;

rendering a user interface of the mobile device to display at least a portion of the directory;

receiving an input to the user interface indicating a selection of a first resident of the building; and based at least in part on the input, performing a first action corresponding to the first resident of the building.

2. The computer-implemented method of claim 1, wherein:

the first short distance wireless communication component comprises a first near field communication (NFC) communication reader; and the second short distance wireless communication component comprises an NFC tag.

3. The computer-implemented method of claim 1, further comprising:

causing the server to perform a validation operation based at least in part on the third signal.

4. The computer-implemented method of claim 1, wherein the first action comprises initiating a communication with a third device corresponding to the first resident.

5. The computer-implemented method of claim 4, wherein the communication comprises a one-way video call between the mobile device and the third device and wherein the method further comprises:

connecting the mobile device to the third device on a call, wherein first image data captured by a first camera of the mobile device is sent to the third device during the call but second image data captured by a second camera of the third device is not sent to the mobile device during the call.

6. The computer-implemented method of claim 1, wherein the first action comprises outputting a notification indicating authorization to enter the building.

7. The computer-implemented method of claim 6, further comprising:

causing the first short distance wireless communication component of a mobile device to engage in a third short distance wireless communication with the second short distance wireless communication component of a second device, the third short distance wireless communication resulting in access to the building.

8. The computer-implemented method of claim 1, wherein the first action comprises causing the mobile device to download an application corresponding to the building.

9. A system comprising:

at least one processor; and at least one memory comprising instructions that, when executed by the at least one processor, cause the system to:

send, by a first short distance wireless communication component of a mobile device, a first signal to a second short distance wireless communication component of a second device, the second device corresponding to an access point of a building;

receive, from the second short distance wireless communication component, a second signal including a first uniform resource locator (URL) and a cryptographic signature;

send, by a third wireless communication component of the mobile device, a third signal to a server associated with the first URL, the third signal including the cryptographic signature;

receiving, by the third wireless communication component of the mobile device and from the server in response to the third signal, a fourth signal including data corresponding to a directory of residents of the building;

render a user interface of the mobile device to display at least a portion of the directory;

receive an input to the user interface indicating a selection of a first resident of the building; and based at least in part on the input, performing a first action to be corresponding to the first resident of the building.

10. The system of claim 9, wherein:

the first short distance wireless communication component comprises a first near field communication (NFC) communication reader; and the second short distance wireless communication component comprises an NFC tag.

11. The system of claim 9, wherein the at least one memory further comprises instructions that, when executed by the at least one processor, further cause the system to:

cause the server to perform a validation operation based at least in part on the third signal.

12. The system of claim 9, wherein the first action comprises initiating a communication with a third device corresponding to first resident.

13. The system of claim 12, wherein the communication comprises a one-way video call between the mobile device and the third device and wherein the at least one memory further comprises instructions that, when executed by the at least one processor, further cause the system to:

connecting the mobile device to the third device on a call, wherein first image data captured by a first camera of the mobile device is sent to the third device during the call but second image data captured by a second camera of the third device is not sent to the mobile device during the call.

14. The system of claim 9, wherein the first action comprises outputting a notification indicating authorization to enter the building.

15. The system of claim 14, wherein the at least one memory further comprises instructions that, when executed by the at least one processor, further cause the system to:

causing the first short distance wireless communication component of a mobile device to engage in a third short distance wireless communication with the second short distance wireless communication component of a second device, the third short distance wireless communication resulting in access to the building.

16. The system of claim 9, wherein the first action comprises causing the mobile device to download an application corresponding to the building.

17. A system comprising:

at least one processor; and at least one memory comprising instructions that, when executed by the at least one processor, cause the system to:

determine that a first communication component of a mobile device has engaged in a first short distance wireless communication with a second communication component of a second device, the second device corresponding to an access point of a building;

determine that the first short distance wireless communication corresponds to a valid exchange between a server associated with the second device and the mobile device;

based at least in part on the first short distance wireless communication corresponding to a valid exchange, sending a request to a third device corresponding to a resident of the building;

receive, from the third device, a response to the request; and based at least in part on the response, cause a first action to be performed.

18. The system of claim 17, wherein:

the request comprises a request to establish a call between the mobile device and the third device;

the response indicates approval to establish the call; and the first action comprises causing initiation of the call between the mobile device and the third device.

19. The system of claim 17, wherein:

the request comprises a request to permit access to the building;

the response indicates approval to permit access; and the first action comprises sending, to the mobile device, data to be used to access the building.

20. The system of claim 17, wherein the at least one memory further comprises instructions that, when executed by the at least one processor, further cause the system to, after causing the first action to be performed:

determine that the second communication component has been tampered with;

determine that a second mobile device has engaged in a second short distance wireless communication with the second communication component; and based at least in part on the second communication component having been tampered with, determine that the second short distance wireless communication corresponds to an invalid exchange.

* * * * *